United States Patent [19]

Christenson et al.

[11] Patent Number: 4,530,945
[45] Date of Patent: Jul. 23, 1985

[54] PIGMENT GRINDING VEHICLE

[75] Inventors: Roger M. Christenson; Roger L. Scriven, both of Gibsonia; Robert D. Jerabek, Glenshaw; Jeffrey G. Koren, Butler; Mark W. Johnson, Gibsonia, all of Pa.

[73] Assignee: PPG Industries, Inc., Pittsburgh, Pa.

[21] Appl. No.: 641,351

[22] Filed: Aug. 15, 1984

Related U.S. Application Data

[63] Continuation of Ser. No. 430,184, Sep. 30, 1982, abandoned.

[51] Int. Cl.³ .............................................. C08L 63/00
[52] U.S. Cl. ................................ 523/400; 106/308 F; 106/308 N; 260/404; 260/501.15; 525/504; 525/533
[58] Field of Search ................. 523/400; 525/504, 533; 260/404, 501.15; 106/308 F, 308 N

[56] References Cited

U.S. PATENT DOCUMENTS

| | | | |
|---|---|---|---|
| 2,928,809 | 3/1960 | Hicks | 525/533 |
| 3,223,718 | 12/1965 | Scherr et al. | 260/404 |
| 3,468,816 | 9/1969 | Thompson et al. | 564/292 |
| 3,824,111 | 7/1974 | Jerabek | 106/308 N |
| 3,936,405 | 2/1976 | Sturni et al. | 260/29.2 EP |
| 4,007,154 | 2/1977 | Schimmel et al. | 260/37 EP |
| 4,042,413 | 8/1977 | Hauswell et al. | 106/308 N |
| 4,186,124 | 1/1980 | Schimmel et al. | 260/37 EP |

FOREIGN PATENT DOCUMENTS

| | | | |
|---|---|---|---|
| 0008761 | 3/1980 | European Pat. Off. | 260/404 |
| 2602220 | 7/1977 | Fed. Rep. of Germany | 523/400 |

OTHER PUBLICATIONS

NEO-FAT ® Fatty Acids Manual–by Armak Chemicals Division (1971), see pp. 15–17.

Primary Examiner—Lewis T. Jacobs
Attorney, Agent, or Firm—Godfried R. Akorli

[57] ABSTRACT

A quaternary ammonium group-containing material and its method of preparation are disclosed. The quaternary ammonium group contains at least one organic group which contains an acyclic group of at least 8 carbon atoms and also contains a group of the structure

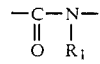

wherein $R_1$ is hydrogen or lower alkyl. The quaternary ammonium group-containing materials are useful as pigment grinding vehicles and in the formulation of pigment paste, particularly pigment paste with high pigment loadings. When formulated in cationic electrodepositable compositions, the pigment grinding vehicles provide for cured electrodeposited coatings of excellent corrosion resistance, particularly over untreated and oily steel.

13 Claims, No Drawings

PIGMENT GRINDING VEHICLE

This application is a continuation of application Ser. No. 430,184, filed Sept. 30, 1982, now abandoned.

BACKGROUND OF THE INVENTION

1. Field of the Invention

The present invention relates to compositions of matter particularly useful as pigment grinding vehicles and to pigment paste formulated with such pigment grinding vehicle.

2. Brief Description of the Prior Art

In the formation of paint compositions, and especially electrodepositable paint compositions, an important factor is the introduction of pigments into the coating composition. The pigments are typically ground in a pigment grinding vehicle which acts as a dispersing agent to form a paste, and the resultant pigment paste is incorporated into the coating composition to give the coating composition proper color, opacity, application and film properties.

The properties that make a good pigment dispersant quite often are detrimental to overall coating performance. The high polarity associated with dispersants results in poor humidity resistance and durability of the final coating. Thus, it is desirable to have the dispersant be as efficient as possible in dispersing pigments such that minimal amounts of the dispersant vehicle are incorporated in the final coating composition.

SUMMARY OF THE INVENTION

In accordance with the foregoing, the present invention encompasses a quaternary ammonium group-containing material which is obtained by reacting:
(i) a 1,2-epoxy-containing material, and
(ii) an amine containing an organic group which contains an acyclic moiety of at least 8 carbon atoms, and also containing a group of the structure:

wherein $R_1$ is hydrogen or lower alkyl containing from about 1 to 4 carbon atoms;
the reaction is conducted under conditions sufficient to form the quaternary ammonium base group.

Further encompassed by the present invention are pigment pastes and the process for preparing same. The pigment pastes are prepared by dispersing a pigment or pigments in a quaternary ammonium group-containing material, characterized in that at least one organic group of the quaternary ammonium group contains an acyclic moiety of at least 8 carbon atoms and also contains a group of the structure:

where $R_1$ is hydrogen or a lower alkyl containing 1 to 4 carbon atoms. Preferably, the quaternary ammonium group-containing material is prepared in the manner described hereinabove.

In accordance with the foregoing, the instant quaternary ammonium group-containing materials are particularly useful as pigment dispersants or grinding vehicles in preparing pigment pastes. The pastes can be useful in inks and many types of coatings, particularly in cationic electrodepositable compositions.

While not desiring to be bound by any particular theory, it is believed that the

group, by virtue of its polarity, imparts to the compositions of this invention good pigment wetting properties while the acyclic moiety improves substrate wetting of coating compositions. These properties result in pigment pastes with high pigment loadings and in coating compositions formulated with such pastes that have excellent corrosion resistance.

DETAILED DESCRIPTION OF THE INVENTION

The quaternary ammonium group-containing material can be prepared by reacting in the presence of acid and/or water a 1,2-epoxy-containing material with an amine containing an organic group which contains an acyclic moiety of at least 8 carbon atoms and also containing a group of the structure

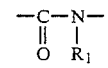

wherein $R_1$ is hydrogen or lower alkyl, under conditions sufficient to form a quaternary ammonium group-containing material.

The 1,2-epoxy material can be a monomeric or polymeric compound or a mixture of compounds having a 1,2-epoxy functionality equal to or greater than 1.0, and up to 4.0. The epoxy groups can also be attached to polymeric or resinous materials. It is preferred that the polyepoxide be polymeric or resinous and have a 1,2-epoxy equivalent of about 100 to 500.

The 1,2-epoxy material can be a polyepoxide, that is, contain on an average 1.5 to 4 epoxy groups per molecule. Examples of polyepoxides are the polyglycidyl ethers of polyhydric phenols such as bisphenol A. These may be prepared, for example, by etherification of a polyphenol with epichlorohydrin or dichlorohydrin in the presence of an alkali. The phenolic compound may be bis(4-hydroxyphenyl)2,2-propane; 4,4'-dihydroxybenzophenone; bis(4-hydroxyphenyl)1,1-ethane; bis(4-hydroxyphenyl)1,1-isobutane; bis(4-hydroxytertiarybutylphenyl)2,2-propane; bis(2-hydroxy-naphthyl)methane; 1,5-hydroxynaphthalene; or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis-(4-hydroxycyclohexyl)2,2-propane, and the like.

There can also be employed polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthalene dicarboxylic acid, dimerized linoleic acid and the like. Examples are diglycidyl adipate and diglycidyl phthalate.

Also useful are polyepoxides derived from the epoxidation of an olefinically unsaturated alicyclic compound, for example, by oxygen and selected metal catalyst, by perbenzoic acid, by acid-aldehyde monoperacetate or by peracetic acid. Among the polyepoxides are the epoxy alicyclic ethers and esters which are well known in the art.

Examples of other 1,2-epoxy materials are monoepoxides such as those represented by the following structural formula:

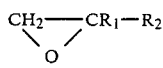

wherein $R_1$ is hydrogen and methyl and $R_2$ is hydrogen, alkyl including cycloalkyl, aryl preferably containing from 1 to 18 carbon atoms, substituted alkyl and aryl moieties, as long as the substituents do not interfere with reaction of the monoepoxide with the amine or the intended use of the resultant product, such as —CH$_2$OR$_3$ and

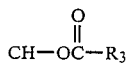

where $R_3$ is alkyl including cycloalkyl, aryl and substituted alkyl including cycloalkyl and aryl in which the alkyl and aryl moieties contain from 1 to 18 carbon atoms.

Illustrative examples of the monoepoxides are alkylene oxides containing from 2 to 8 carbon atoms including ethylene oxide, propylene oxide, 1,2-butylene oxide, 1,2-pentene oxide, styrene oxide and glycidol. Examples of other suitable materials are glycidyl esters of monobasic acids such as glycidyl acrylate, glycidyl methacrylate, glycidyl acetate, glycidyl butyrate; and glycidyl ethers of alcohols and phenols such as butyl glycidyl ether and phenyl glycidyl ether.

Particularly preferred are glycidyl ethers or esters of acids or alcohols containing an acyclic group of from about 4 to 24 carbon atoms. Typical examples of acids and alcohols include the saturated straight chain and branched chain series of fatty alcohols and acids as well as ethylenically unsaturated species and mixtures thereof, including octanoic or 2-ethylhexanoic acid at the lower end proceeding to lauric, palmitic, stearic, etc., at the upper end of the group. Highly branched tertiary carboxylic acid mixtures such as Shell's Versatic 911 acids are particularly useful herein. Fatty alcohols of equivalent chain length are used for the preparation of the glycidyl ethers.

The amine containing an organic group which contains an acyclic moiety of at least 8 carbon atoms and also containing a group of the structure

wherein $R_1$ is hydrogen or lower alkyl, can be synthetically prepared. One method of preparation involves reacting a polyfunctional amine with a fatty acid or a fatty isocyanate. Examples of polyfunctional amines are those which have amines of varying reactivity such as a secondary amine and a primary amine or a tertiary amine and a primary amine, which is preferred.

Other examples of polyfunctional amines are those having an amine group and a hydroxyl group, particularly a tertiary amine group and a hydroxyl group. After the reaction, there should be at least one amine group available to form the quaternary ammonium group.

The preferred polyfunctional amines are aliphatic polyfunctional amines which are, in particular, diamines. Specific examples of the preferred polyfunctional amines include dimethylaminopropylamine, diethylene triamine, N-methyl ethylene diamine, dimethylamino ethylene diamine, N,N,N'-trimethyl-1,3-propanediamine and N,N-dimethyl-2,4-toluene diamine.

The fatty acid useful herein includes monocarboxylic and polycarboxylic acid containing at least 8, preferably 12 to 40, and most preferably 30 to 36 carbon atoms. Examples of monocarboxylic acids include saturated and unsaturated acids such as caprylic acid, myristic acid, palmitic acid, stearic acid, oleic acid, linoleic acid and linolenic acid. Such acids can be those derived from naturally occurring oils and which are named from the oil from which it is derived, e.g., linseed fatty acids, soya fatty acids, cottonseed fatty acids, coconut fatty acids and the like. Examples of polycarboxylic acids are dodecanedioic acid and dimerized and trimerized unsaturated fatty monocarboxylic acids such as dimerized linoleic acid.

The fatty isocyanates useful herein can be monoisocyanates and polyisocyanates containing at least 8, preferably 12 to 40, most preferably 30 to 36 carbon atoms. Specific examples include dodecylisocyanate, octadecylisocyanate, 4-nonylphenyl isocyanate and dimer acid diisocyanate. Also, isocyanate-containing reaction products of fatty alcohols or fatty amines, i.e., those containing at least 8, preferably 12 to 40 carbon atoms, such as stearyl alcohol or cocoamine with polyisocyanates such as toluene diisocyanate can be used. These reaction products which contain unreacted isocyanate can then be reacted with the polyfunctional amines as described above.

An alternate method of preparation involves reacting a fatty amine or fatty hydrazine with isocyanates, such as half-capped isocyanates. After the reaction, at least one amine group should be available to form the quaternary ammonium group.

The 1,2-epoxy material and the amine described above are reacted together under conditions sufficient to form an ungelled quaternary ammonium group.

In the case of tertiary amines, the 1,2-epoxy-containing material and the amine can be reacted by simply mixing the components preferably in the presence of a controlled amount of water. The amount of water employed should be that amount of water which allows for smooth reaction of epoxy groups. Typically, the water is employed on the basis of about 1.0 to about 16, preferably 2 to 10 moles of water per equivalent of amine nitrogen.

The reaction proceeds at room temperature in most cases and, in some cases, exothermically, so that moderate cooling may be necessary. In some cases, moderately elevated temperature can be used and is preferred. Typically, the reaction is conducted between about 50° C. and 100° C. The reaction may be conducted in the presence of a solvent if desired. If a solvent is employed, preferably it is capable of being used in the ultimate composition which is formed. For example, alcohols, ketones and glycol ethers may be used.

As mentioned above, the reaction of the amine and 1,2-epoxy material is usually conducted in the presence of acid and/or water to form the quaternary ammonium salt or hydroxide. The presence of water is preferred to moderate the reaction. The presence of acid is preferred for pigment grinding. The amine can be first neutralized with acid to form the amine salt followed by reaction with the polyepoxide. Alternately, the polyepoxide, amine and acid can be reacted simultaneously or the amine and epoxide can be first reacted followed by acidification.

The acids useful can be organic or inorganic acids, preferably those having a pKa less than 6. Preferably, the acid is water soluble, and preferably it is organic. Examples of acids include phosphoric acid, acetic acid and lactic acid.

Besides tertiary amines which are preferred, useful compositions can be prepared with primary or secondary amines. This is accomplished by first reacting the primary or secondary amine with the 1,2-epoxy material to form a tertiary amine. Reaction is continued until a tertiary amine is formed. Further reaction with unreacted epoxy which may be the same as that originally reacted or can be a different 1,2-epoxy material is continued to form the quaternary ammonium base. If the 1,2-epoxy material is a polyepoxide, precautions should be taken to avoid gelling. Its molecular weight should be low and additional monoepoxide should be used.

Besides quaternizing with additional monoepoxide, quaternization can be done with dimethylsulfate or methyl iodide, but their use is less preferred for electrodeposition.

The compositions of the invention have been found to be very effective as pigment grinding vehicles. The grinding vehicles are used to prepare pigment pastes containing one or more pigments which are ground with the grinding vehicle.

The pigment pastes are prepared by grinding or dispersing the pigment into the grinding vehicle in a manner well known in the art. The pigment paste comprises as essential ingredients the quaternary ammonium pigment grinding vehicle prepared as described above and at least one pigment; however, the paste may, in addition, contain optional ingredients such as plasticizers, wetting agents, surfactants or defoamers.

Grinding can be accomplished by using ball mills, sand mills, Cowles dissolvers, continuous attritors and the like until the pigment has been reduced to the desired size, preferably has been wet by and dispersed by the grinding vehicle. After grinding, the particle size of the pigment is generally in the range of 10 microns or less, preferably as small as practical. Hegman grind gauge readings of about 6 to 8 are usually employed.

Preferably, grinding is conducted in an aqueous dispersion of the vehicle. The amount of water present in the aqueous grind should be sufficient to produce a continuous aqueous phase. The aqueous grind usually contains about 30–70 percent total solids. The use of more water merely reduces the effective capacity of the mill and, while less water can be employed, higher resultant viscosity may create problems in certain instances.

One of the advantages of the pigment grinding vehicles of the present invention is their ability to be formulated into pastes with high pigment-to-grinding vehicle weight ratios. Depending upon the pigment to be dispersed, typical weight ratios of at least 10:1, preferably higher, at least 20:1, even up to 50 to 80:1, can be attained without the paste settling or separating when stored for 7 days at 120° F. (49° C.). Lower ratios of as low as 1:1 can also be used if desired.

Pigments which may be employed in the practice of the invention are pigments well known in the art. Generally, titanium dioxide is the sole or chief white pigment; other white pigments and/or extender pigments including antimony oxide, zinc oxide, basic lead carbonate, basic lead sulfate, barium carbonate, China clay, calcium carbonate, aluminum silicate, silica, magnesium carbonate, magnesium silicate, among others, may be used. Colored pigments may also be employed, for example, cadmium yellow, cadmium red, carbon black, phthalocyanine blue, chome yellow, toluidine red, hydrated iron oxide, among others.

The pigment paste can be combined with a film-forming resin to form a paint. The film-forming resin can be a cationic resin known in the art for electrodeposition. These resins are well known in the art and need not be described in detail. Examples of suitable resins include tertiary amine salt-containing resins such as those described in U.S. Pat. No. 4,148,772, assigned to PPG Industries, Inc., the assignee of the present invention, and quaternary ammonium salt-containing resins such as those described in U.S. Pat. No. 3,839,252 to Bosso et al. The portions of these references which describe suitable electrodepositable resins for cationic electrodeposition are hereby incorporated by reference.

Enough of the pigment paste is used so that the final electrodepositable composition (electrodepositable resin plus pigment paste) has the properties required for electrodeposition. In most instances, the final electrodepositable composition has a pigment-to-binder (electrodepositable resin plus pigment dispersant) ratio of between about 0.05 to about 0.6.

For electrodeposition, a bath containing about 5–25 percent by weight solids, that is, pigment plus resinous vehicle, is usually employed. This aqueous composition is then placed in contact with an electrically conductive anode and an electrically conductive cathode in an electric circuit. While in contact with the bath containing the coating composition, an adherent film of the coating composition is deposited on the cathode.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts are usually employed. The current density is usually between about 0.25 ampere and 15 amperes per square foot and tends to decrease during electrodeposition.

The method of the invention is applicable to the coating of any conductive substrate and especially metal, such as steel, aluminum, copper and the like. After deposition, the coating is cured at elevated temperatures by any convenient method, such as in baking ovens or with banks of infrared heat lamps. Curing temperatures of at least 100° C., and usually 125° to 185° C. for at least 10 minutes and usually for about 10 to 30 minutes are employed.

One of the advantages of the pigment grinding vehicles of the present invention is the excellent corrosion resistance they impart to cationic electrodeposited coatings over untreated steel or oily steel substrates, even when the coatings are cured at relatively low temperatures, i.e., 175° C. and below, typically 160°-175° C.

Illustrating the invention are the following examples which are not to be construed as limiting the invention to their details. All parts and percentages in the examples, as well as throughout the specification, are by weight unless otherwise specified.

EXAMPLE I

This example illustrates the preparation of the instant composition of matter by reacting dimethylaminopropylamine with a fatty acid, followed by quaternization with a monoepoxide.

The reaction of dimethylaminopropylamine with the fatty acid was conducted as follows:

| Ingredients | Parts by Weight (grams) |
| --- | --- |
| Empol 1010[1] | 285.7 |
| Dimethylaminopropylamine | 127.73 |

[1] A dimerized linoleic acid, available from Emery Industries.

To a properly equipped reaction vessel was charged the Empol 1010 and the dimethylaminopropylamine with a resulting exotherm to 75° C. The resultant reaction mixture was heated to reflux through a Vigreaux column for about 2 hours over a temperature range of 135° to 140° C. Thereafter, the reaction mixture was cooled to 132° C. and a Dean-Stark trap inserted on top of the Vigreaux column. Following this, water and unreacted dimethylaminopropylamine were removed from the reaction mixture by distillation over a period of 8 hours. The resultant reaction product was vacuum stripped to remove residual amine.

The reaction product was reacted with butyl glycidyl ether as follows:

| Ingredients | Parts by Weight (grams) |
| --- | --- |
| Reaction product | 301.5 |
| 2-Butoxyethanol | 208.5 |
| 88% Lactic acid | 90 |
| Deionized water | 71.3 |
| Butyl glycidyl ether | 128.1 |

The reaction product and the 2-butoxyethanol were charged to a properly equipped reaction vessel, and heated to 50° C., followed by adding the lactic acid. There was a resulting exotherm, with the reaction temperature being maintained over the range of 55°-65° C. for about 15 minutes. Thereafter, the deionized water was added, and the reaction mixture was allowed to react for about 15 minutes over the temperature range of 55°-65° C. This was followed by adding the butyl glycidyl ether and heating the reaction mixture to 75° C. and allowing it to react for 2 hours over the temperature range of 75°-85° C. The resultant reaction product had a solids content of 60.7 percent.

EXAMPLE II

This example shows the formulation of pigment paste with high pigment loadings using the reaction product of Example I as a grinding vehicle.

The pigment paste was prepared as follows:

| Ingredients | Resin Solids | Pigment Solids | Parts by Weight (grams) |
| --- | --- | --- | --- |
| Grinding vehicle of Example I | 24.8 | | 39.8 |
| Deionized water | | | 475.0 |
| Titanium dioxide | | 791.7 | 791.7 |
| Lead silicate | | 52.2 | 52.2 |
| Carbon black | | 26.1 | 26.1 |

The above paste and pigments were ground in a sand mill for 2 hours to a Hegman 7+ grind. The resultant paste had a pigment-to-binder ratio of 35:1.

EXAMPLE III

This example shows the preparation of a grinding vehicle made from reacting dimethylaminopropylamine and coconut fatty acid, followed by quaternization with a polyepoxide. A pigment paste was then prepared with the grinding vehicle. The grinding vehicle was prepared from the following ingredients:

| Ingredients | Parts by Weight (grams) | Equivalents |
| --- | --- | --- |
| Coconut fatty acid | 1275 | 6 |
| Dimethylaminopropylamine | 705.05 | 6.9 |

The reaction conditions were essentially the same as described in Example I. The resultant reaction product had an amine equivalent of 288.

The above reaction product was quaternized with a polyepoxide to form a pigment grinding vehicle. The following were used in the preparation:

| Ingredients | Parts by Weight (grams) | Equivalents |
| --- | --- | --- |
| Reaction product | 263.1 | 0.91 |
| 2-Butoxyethanol | 100 | |
| Lactic acid (88%) | 111 | 1.09 |
| Deionized water | 88 | |
| EPON 828[1] | 220 | 1.17 |
| 2-Butoxyethanol | 132 | |

[1] Polyglycidyl ether of bisphenol A having an epoxy equivalent of about 188, commercially available from Shell Chemical Company.

The grinding vehicle was prepared essentially in the same manner as described in Example I. The grinding vehicle had a solids content of 68.3 percent.

The above grinding vehicle was used in preparing a pigment paste in essentially the same manner as described in Example I.

The following were used in the preparation:

| Ingredients | Parts by Weight (grams) | Resin Solids | Pigment Solids |
| --- | --- | --- | --- |
| The above grinding vehicle | 36.3 | 24.8 | |
| Deionized water | 453.5 | | |
| Titanium dioxide | 791.7 | | 791.7 |
| Carbon black | 26.1 | | 26.1 |
| Lead silicate | 52.2 | | 52.2 |

The resultant paste had a pigment-to-binder weight ratio of 35:1.

EXAMPLE IV

This example also illustrates the preparation of the instant composition of matter by reacting dimethylaminopropylamine with a dimer diisocyanate, followed by quaternizing the resulting reaction product. The preparation was as follows:

| Ingredients | Parts by Weight (grams) | Equivalents |
|---|---|---|
| Dimer diisocyanate[1] | 187.2 | 0.6 |
| Dimethylaminopropyl-amine | 61.3 | 0.6 |

[1]Dimeryl diisocyanate having NCO equivalent of 312 which is derived from a dimerized fatty acid, available from Henkel Corporation.

The dimer diisocyanate was charged to a properly equipped reaction vessel and the dimethylaminopropylamine was added thereto over a period of 2 hours with a resulting exotherm and a temperature rise to 77° C. With all the dimethylaminopropylamine added and at a temperature of 77° C., the resulting mixture was held until all the isocyanate had been reacted. The resultant reaction product had a milliequivalent of amine per gram of 2.43.

The above reaction product was quaternized with a monoepoxide to form the pigment grinding vehicle of the invention. The following were used in the preparation:

| Ingredients | Parts by Weight (grams) | Equivalents |
|---|---|---|
| The above reaction product | 102.88 | 0.25 |
| 2-Butoxyethanol | 69.4 | |
| Lactic acid (88%) | 27.75 | 0.27 |
| Deionized water | 22 | |
| Butyl glycidyl ether | 39.2 | 0.29 |

The grinding vehicle was prepared by quaternizing the above reaction product in essentially the same manner as described in Example I. The resulting grinding vehicle had a solids content of 65.9 percent.

The above grinding vehicle was used in preparing a pigment paste in essentially the same manner as described in Example II. The following were used in the preparation:

| Ingredients | Parts by Weight (grams) | Resin Solids | Pigment Solids |
|---|---|---|---|
| The above grinding vehicle | 37.6 | 24.8 | |
| Deionized water | 350 | | |
| Titanium dioxide | 791.7 | | 791.7 |
| Lead silicate | 52.2 | | 52.2 |
| Carbon Black | 26.1 | | 26.1 |

The resultant paste had a pigment to binder weight ratio of 35 to 1.

EXAMPLE V

This example also illustrates the grinding vehicle of the present invention which was prepared by reacting a dimer diisocyanate with dimethylethanolamine, followed by quaternizing the resulting reaction product with a monoepoxide. The preparation was as follows. The grinding vehicle was prepared essentially in the same manner as described in Example I. The following were used in the preparation:

| Ingredients | Parts by Weight (grams) | Equivalents |
|---|---|---|
| Dimer diisocyanate | 156 | 0.5 |
| Dibutyltin dilaurate | 0.04 | |

-continued

| Ingredients | Parts by Weight (grams) | Equivalents |
|---|---|---|
| Dimethylethanolamine | 44.5 | 0.5 |

The dimer diisocyanate and the dibutyltin dilaurate were charged to a properly equipped reaction vessel, followed by adding the dimethylethanolamine slowly over a period of 10 minutes. There was a resulting exotherm with a temperature rise to 100° C. Upon completion of the addition of dimethylethanolamine, the reaction mixture was cooled to 75° C. and held for about half an hour until all the isocyanate had reacted. The resultant reaction product had a milliequivalent of amine per gram of 2.443.

The above reaction product was quaternized with a monoepoxide to form a pigment grinding vehicle in essentially the same manner as described in Example I. The following were used in the preparation:

| Ingredients | Parts by Weight (grams) | Equivalents |
|---|---|---|
| The above reaction product | 102.3 | 0.25 |
| 2-Butoxyethanol | 69.1 | |
| Lactic acid (88%) | 27.75 | 0.27 |
| Deionized water | 22 | |
| Butyl glycidyl ether | 39.2 | 0.29 |

The grinding vehicle had a solids content of 62.2.

The above grinding vehicle was used in preparing a pigment paste in essentially the same manner as described in Example II.

The following were used in the preparation:

| Ingredients | Parts by Weight (grams) | Pigment Solids |
|---|---|---|
| The above grinding vehicle | 39.8 | 24.8 |
| Deionized water | 350 | |
| Titanium dioxide | 791.7 | 791.7 |
| Lead silicate | 52.2 | 52.2 |
| Carbon black | 26.1 | 26.1 |

The resultant paste had a pigment to binder weight ratio of 35 to 1.

EXAMPLE VI

This example shows the preparation of the instant grinding vehicles and pigment pastes prepared therefrom and the use of the pigment pastes in cationic paints.

A grinding vehicle was prepared in essentially the same manner as described in Example I. The following were used in the preparation:

| Ingredients | Parts by Weight (grams) |
|---|---|
| Empol 1010 | 1311 |
| Dimethylaminopropylamine | 255.45 |
| Dimethylaminopropylamine | 255.45 |
| Dimethylaminopropylamine | 255.45 |

The resultant reaction product had an amine equivalent of 398.

The above reaction product was quaternized with a butyl glycidyl ether in essentially the same manner as described in Example I. The following were used in the preparation:

| Ingredients | Parts by Weight (grams) |
| --- | --- |
| The above reaction product | 379.8 |
| 2-Butoxyethanol | 161.5 |
| 88% Lactic acid | 111 |
| Deionized water | 88 |
| Butyl glycidyl ether | 158.2 |
| 2-Butoxyethanol | 100 |

The resultant product was a grinding vehicle having a resin solids content of 62.9 percent.

A pigment paste was prepared comprising the above grinding vehicle, in essentially the same manner as described in Example II. The following were used in the preparation:

| Ingredients | Parts by Weight (grams) |
| --- | --- |
| The above grinding vehicle | 38.5 |
| Aluminum silicate clay | 446.4 |
| Lead silicate | 72.1 |
| Carbon black | 57.5 |
| Dibutyltin oxide | 20.1 |
| Deionized water | 535.5 |

The grinding vehicle was blended with the above pigments and the deionized water to form a slurry which was ground in a Jiffy mill for 2 hours to a Hegman 7+ grind. The resultant paste had a pigment-to-binder weight ratio of 25:1.

A cationic paint comprising a blend of the above pigment paste and an electrodepositable resinous film-forming composition was prepared as follows. The electrodepositable resinous film-forming composition was prepared with the following:

| Ingredients | Parts by Weight (grams) |
| --- | --- |
| EPON 829[1] | 727.6 |
| PCP-0200 | 268.4 |
| Xylene | 36.1 |
| Bisphenol A | 197.8 |
| Benzyldimethylamine | 3.8 |
| Capped isocyanate crosslinker[2] | 933.5 |
| Diketimine derived from diethylene triamine and methyl isobutyl ketone (73% solids in methyl isobutyl ketone) | 73.4 |
| N—methylethanolamine | 59.1 |
| 2-Hexoxyethanol | 76.5 |
| Acetic acid | 33.5 |
| Cationic dispersant[3] | 29.4 |
| Deionized water | 1793.1 |

[1]Epoxy resin solution made from reacting epichlorohydrin and bisphenol A having an epoxy equivalent of 188, commercially available from Shell Chemical Company.
[2]Polyurethane crosslinker formed from half-capping toluene diisocyanate (80/20 2,4-/2,6-isomer mixture) with 2-ethylhexanol and reacting this product with trimethylolpropane in a 3:1 molar ratio. The crosslinker is present as a 70 percent solids solution in a 90/10 mixture of methyl isobutyl ketone and n-butanol.
[3]The cationic dispersant was prepared by blending 120 parts of an alkyl imidazoline commercially available from Geigy Industrial Chemicals as GEIGY AMINE C, 120 parts by weight of an acetylenic alcohol commercially available from Air Products and Chemicals Inc. as SURFYNOL 104, 120 parts by weight of 2-butoxyethanol, 221 parts by weight of deionized water and 19 parts of glacial acetic acid.

The EPON 829, PCP-0200 and xylene were charged to a reaction vessel and heated with a nitrogen sparge to 210° C. The reaction was held at reflux for about ½ hour to remove water azeotropically. The reaction mixture was cooled to 150° C. and the bisphenol A and 1.6 parts of the benzyldimethylamine (catalyst) added. The reaction mixture was heated to 150°–190° C. and held at this temperature for about 1½ hours and then cooled to 130° C. The remaining portion of the benzyldimethylamine catalyst was added and the reaction mixture held at 130° C. for 2½ hours until a reduced Gardner-Holdt viscosity (50 percent resin solids solution in 2-ethoxyethanol) of P was obtained.

The polyurethane crosslinker, the diketimine derivative and the N-methylethanolamine were then added and the temperature of the reaction mixture brought to 110° C. and held at this temperature for 1 hour.

The 2-hexoxyethanol was added and the reaction mixture was dispersed in water by adding the reaction mixture to a mixture of the acetic acid, deionized water and the cationic dispersant. This dispersion was diluted to 32 percent solids with deionized water and vacuum stripped to remove organic solvent to give a dispersion having a solids content of 36 percent.

The above electrodepositable composition and pigment pastes were blended to form a cationic paint having a pigment-to-binder ratio of 0.2 and a bath solids content of 20 percent. The paint had a conductivity of about 1380 μmhos/cm after ultrafiltration, and after pH was adjusted with lactic acid to 6.2. Steel panels were electrodeposited in the paint at 200–275 volts for 2 minutes at a paint temperature of 80° F. (25° C.). The coated panels were baked at 340° F. (170° C.) and 360° F. (182° C.) for 20 minutes to obtain hard, glossy and smooth coatings.

The above specific illustrations and other descriptions herein are not intended to limit the scope of the invention. Instead, it is intended that the invention include all the variations and modifications falling within the scope of the appended claims.

What is claimed is:

1. A quaternary ammonium group-containing material which is obtained by reacting:
   (i) a 1,2-epoxy-containing material which is a polyepoxide or a monoglycidyl ether or ester, with
   (ii) an amine containing an organic group which contains an acyclic moiety of at least 8 carbon atoms, and also containing a group of the structure:

where $R_1$ is hydrogen or lower alkyl containing 1 to 4 carbon atoms,
under conditions sufficient to form the quaternary ammonium group.

2. The quaternary ammonium group-containing material of claim 1, in which the 1,2-epoxy-containing material to amine equivalent ratio is greater than or equal to 1.

3. The quaternary ammonium group-containing material of claim 1, in which the polyepoxide has a 1,2-epoxy equivalent of 100 to 500.

4. The quaternary ammonium group-containing material of claim 1, in which the amine is a reaction product of a diamine containing both a tertiary amine and a primary amine and a carboxylic acid containing an organic group which contains an acyclic moiety of at least 8 carbon atoms.

5. The quaternary ammonium group-containing material of claim 4, in which the amine is the reaction product of a diamine containing both a tertiary amine and a primary amine with an isocyanate containing an organic group which contains an acyclic moiety of at least 8 carbon atoms.

6. The quaternary ammonium group-containing material of claim 4, in which the amine is the reaction product of a tertiary alkanolamine and an isocyanate containing an organic group which contains an acyclic moiety of at least 8 carbon atoms.

7. The quaternary ammonium group-containing material of claim 1, in which the amine is a reaction product of dimethylaminopropylamine and a dimerized fatty acid containing an organic group which contains an acyclic moiety of at least 8 carbon atoms.

8. The quaternary ammonium group-containing material of claim 7, in which the acid is dimerized linoleic acid.

9. A pigment paste comprising:
(a) a quaternary ammonium group-containing material, characterized in that at least one organic group of the quaternary ammonium group contains an acyclic moiety of at least 8 carbon atoms and also contains a group of the structure:

where $R_1$ is hydrogen or lower alkyl containing 1 to 4 carbon atoms, and (b) a pigment dispersed therein.

10. The pigment paste of claim 9, in which the acyclic moiety of the quaternary ammonium group-containing material contains from 12 to 30 carbon atoms.

11. The pigment paste of claim 9, in which the group

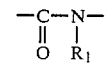

of the quaternary ammonium group-containing material is an amido group.

12. The pigment paste of claim 9, in which the group

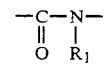

of the quaternary ammonium group-containing material is a urea or a urethane group.

13. The pigment paste of claims 9, 10, 11, or 12, wherein the weight ratio of (b) to (a) is at least 20:1.

* * * * *